United States Patent
Gemmati

(12) 
(10) Patent No.: US 8,540,184 B2
(45) Date of Patent: Sep. 24, 2013

(54) LONG-RANGE AIRCRAFT WITH HIGH FORWARD SPEED IN CRUISING FLIGHT

(75) Inventor: Bernard Gemmati, Lauris (FR)

(73) Assignee: Eurocopter, Marignane Cedex (FR)

( * ) Notice: Subject to any disclaimer, the term of this patent is extended or adjusted under 35 U.S.C. 154(b) by 162 days.

(21) Appl. No.: 12/946,932

(22) Filed: Nov. 16, 2010

(65) Prior Publication Data

US 2011/0114798 A1    May 19, 2011

(30) Foreign Application Priority Data

Nov. 17, 2009    (FR) ...................................... 09 05521

(51) Int. Cl.
*B64C 27/22*    (2006.01)
*B64C 27/26*    (2006.01)

(52) U.S. Cl.
USPC ........... 244/6; 244/12.3; 244/17.11; 244/45 A

(58) Field of Classification Search
USPC ..................... 244/6, 7 A, 8, 12.3, 17.21, 23 B, 244/45 A, 17.11
See application file for complete search history.

(56) References Cited

U.S. PATENT DOCUMENTS

| 3,282,534 | A | * | 11/1966 | Serriades | ........................... 244/6 |
| 4,469,294 | A | | 9/1984 | Clifton | |
| 6,467,726 | B1 | | 10/2002 | Hosoda | |
| 6,471,158 | B1 | * | 10/2002 | Davis | ............................... 244/8 |
| 2002/0011539 | A1 | | 1/2002 | Cater, Jr. | |
| 2006/0266879 | A1 | | 11/2006 | Svoboda, Jr. | |
| 2007/0215746 | A1 | * | 9/2007 | Rieken et al. | ...................... 244/6 |
| 2010/0224720 | A1 | * | 9/2010 | Roesch | ......................... 244/12.3 |

FOREIGN PATENT DOCUMENTS

| DE | 20303024 U1 | 8/2003 |
| EP | 2105378 A1 | 9/2009 |
| FR | 2916420 A1 | 11/2008 |
| WO | 2007014531 A1 | 8/2007 |

OTHER PUBLICATIONS

Search Report and Written Opinion Application No. FR 0905521 Dated Jul. 5, 2010.

* cited by examiner

*Primary Examiner* — Tien Dinh
*Assistant Examiner* — Richard R Green
(74) *Attorney, Agent, or Firm* — Brooks Kushman P.C.

(57) ABSTRACT

The present invention relates to an aircraft (1) comprising an airframe (2) provided with a fuselage (10) and fixed wings (20), a rotary wing (30), at least two propellers (41, 42), and a power plant suitable for driving said rotary wing (30) and said propellers (41, 42) into rotation. The fixed wings (20) comprise a front wing (21) arranged in the high portion (15) of the front portion (11) of the fuselage (10), and a rear wing (22) arranged in the rear portion (13) of said fuselage (10), said front and rear wings (21 and 22) each extending transversely on either side of the fuselage (10), said front wing (21) having a first front half-wing (21') and a second front half-wing (21"), at least one of said propellers (41) being mounted on said first front half-wing (21') and at least one of said propellers (42) being mounted on said second front half-wing (21"), said rotary wing (30) being arranged in the central portion (12) so that an axis of rotation (AX) of the rotor (31) of said rotary wing (30) is located between said front and rear wings (21 and 22).

20 Claims, 1 Drawing Sheet

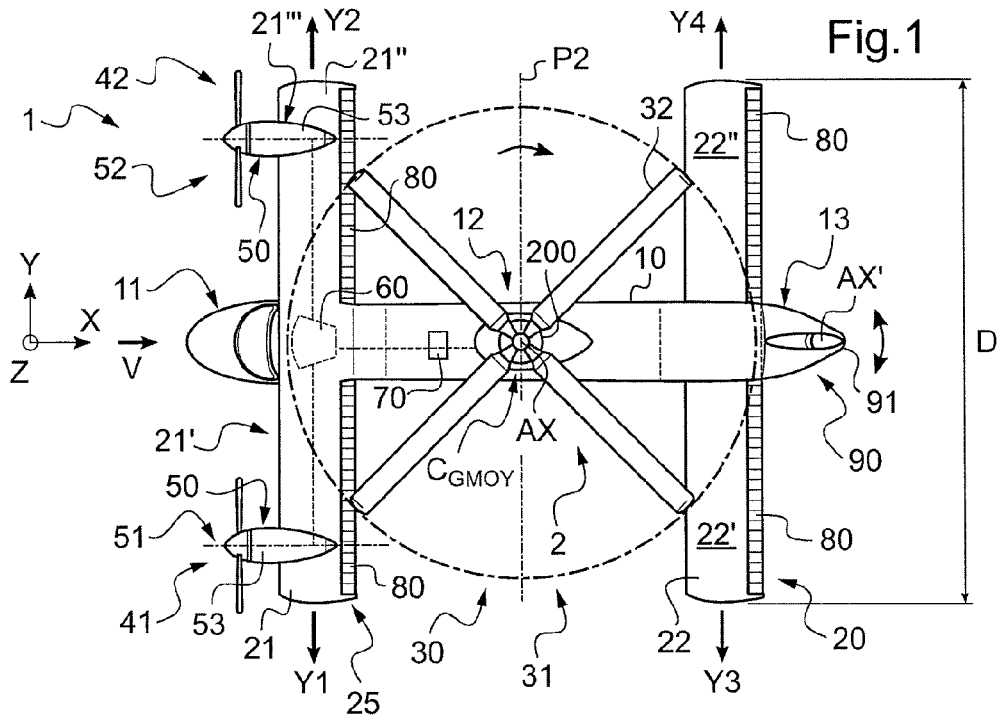
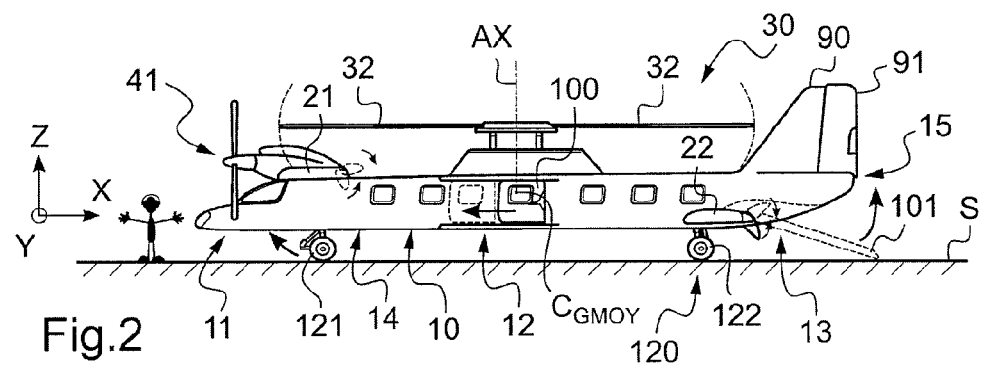
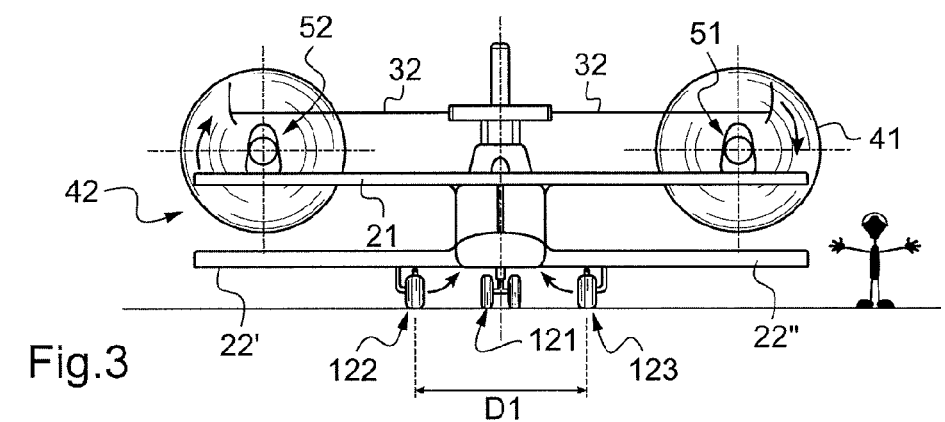

US 8,540,184 B2

LONG-RANGE AIRCRAFT WITH HIGH FORWARD SPEED IN CRUISING FLIGHT

CROSS REFERENCE TO RELATED APPLICATION

This application claims the benefit of FR 09 05521, filed Nov. 17, 2009, the disclosure of which is incorporated herein by reference.

FIELD OF THE INVENTION

The present invention relates to a long-range aircraft with a high forward speed in cruising flight.

More particularly, the invention relates to an aircraft that is capable of taking off and landing vertically, and in particular that is suitable for landing on a platform located at sea in order to convey passengers and goods to the platform. The term "platform located at sea" is used to designate a platform that may be situated at a considerable distance from the shore, e.g. more than 500 kilometers (km), and possibly an off-shore oil platform.

BACKGROUND OF THE INVENTION

In order to understand the object of the invention clearly, it is appropriate to recall that most aircraft comprise either airplanes or rotorcraft.

The term "airplane" is used to designate any aircraft in which lift is provided by at least one fixed wing.

Amongst airplanes, there is a first type of airplane comprising short takeoff and landing airplanes that are provided with a variety of devices seeking to minimize the length of runway needed for landing and taking off, such as high-lift flap devices, for example. That first type of airplane is capable of landing at low speeds of the order of fifty kilometers per hour (km/h).

Although such performance is remarkable, it is not possible to consider landing on and taking off from a small oil platform.

A second known type of airplane comprises airplanes that take off and land vertically. By way of example, mention may be made of the Harrier® jet airplane.

That second type of airplane is indeed capable of landing on an oil platform. Nevertheless, it presents very high fuel consumption, thereby limiting its range and/or its payload.

Known aircraft thus do not appear to be suitable for the need set out above.

Furthermore, the term "rotorcraft" designates any aircraft in which lift is provided in full or in part by one or more propellers of substantially vertical axis and large diameter, referred to as a lift rotor or as a rotary wing.

In the category of rotorcraft, there is the autogyro in which the main rotor is not powered, but rotates in auto-rotation under the effect of the forward speed of the aircraft. Propulsion is provided for example by a propeller having an axis that is substantially horizontal in forward flight and driven by an engine. That formula is not capable of vertical flight, unless the rotor is initially set into rotation by an auxiliary device enabling the rotor to be driven at a faster speed. Under such circumstances, an autogyro cannot hover, but is capable merely of rising or descending following trajectories of very steep slope.

In the category of rotorcraft, there is also the helicopter, having at least one main rotor that is driven by an appropriate engine that serves to provide both lift and propulsion. The helicopter is capable of hovering, i.e. of remaining at a fixed point in three dimensions, is capable of taking off and landing vertically, and is capable of moving in any direction. The vast majority of rotorcraft produced in the world are helicopters.

A helicopter is perfectly capable of landing on an oil platform without difficulty. Nevertheless, the forward speed of a conventional helicopter is low, which prevents it from achieving large ranges and as a result from reaching oil platforms that are far from the shore.

To remedy that, various other novel formulae have been studied to a greater or lesser extent, and some have even given rise to practical embodiments.

In this respect, mention may be made of the compound rotorcraft that takes off and lands like a helicopter, and cruises like an autogyro: its rotor is caused to auto-rotate because of the forward speed of the aircraft and it provides some of its lift, with the remainder being provided by an auxiliary wing, a propeller of substantially horizontal axis delivering the force needed for movement in translation.

The compound rotorcraft is effective but embodiments thereof are often complex and expensive in order to comply with the requirements of the safety standards in force.

The convertible rotorcraft constitutes another particular rotorcraft formula. This term covers any rotorcraft that changes its configuration in flight: takeoff and landing in a helicopter configuration, cruising flight in an airplane configuration, e.g. with two rotors that are tilted through about 90 degrees so that they can act as propellers.

Of those various rotorcraft formulae, the helicopter is the simplest and is therefore the most widespread in spite of the fact that the maximum speed in translation of a helicopter is of the order of 300 km/h, which is low and less than that which can be envisaged by formulae of the combined or convertible type, that are technically more complex and more expensive.

Finally, documents DE 20303024, US 2006/0266879, US 2002/011539, WO 2007/014531, and U.S. Pat. No. 4,469,294 present a variety of aircraft embodiments.

Furthermore, it can be understood that an aircraft that is to provide communication between the shore and an oil platform must be capable of guaranteeing passenger safety under flight conditions that are sometimes difficult.

SUMMARY OF THE INVENTION

An object of the present invention is to propose an aircraft that is an alternative to existing long-range solutions with high forward speed in cruising flight, and that is suitable for conveying passengers and goods to a platform located at sea at a considerable distance from the shore.

The hybrid helicopter should preferably be capable of performing missions effectively with long periods of vertical flight and of performing cruising flight at high speed while also being capable of operating over long ranges.

An object of the present invention is to propose a device that enables the above-mentioned drawbacks to be overcome.

According to the invention, a long-range aircraft with high forward speed comprises:
  an airframe provided with a fuselage extending along a longitudinal direction from a front portion towards a rear portion and passing via a central portion, and in a vertical direction from a low portion to a high portion;
  fixed wings secured to the fuselage;
  a rotary wing above the fuselage;
  at least two propellers for enhancing advance of the aircraft, i.e. puller or pusher propellers; and
  a power plant suitable for driving the rotary wing and the propellers into rotation.

Furthermore, the fixed wings comprise a front wing arranged in the high portion of the front portion of the fuselage and a rear wing arranged in the rear portion of the fuselage, the front and rear wings each extending transversely on either side of the fuselage, the front wing having a first front half-wing extending transversely from the fuselage in a first front traverse direction and a second front half-wing extending transversely from the fuselage in a second front transverse direction, at least one of the propellers being mounted on the first front half-wing and at least one of the propellers being mounted on the second front half-wing, the rotary wing being arranged in the central portion so that the axis of rotation of a rotor of the rotary wing lies between the front and rear wings.

It can be understood that the front wing may be:
continuous, i.e. made as a single unit, the first and second half-wings being secured to each other and mounted together on the fuselage; or
discontinuous, i.e. made up of two distinct portions, the first front half-wing being mounted on one side of the fuselage while the second front half-wing is mounted on the opposite side of the fuselage.

This particular architecture enables the above-mentioned requirements to be satisfied.

At low speed, the rotary wing gives the aircraft the same characteristics as a helicopter, enabling it to hover, and also to take off and land vertically.

Consequently, the aircraft can land on or take off from an oil platform.

Furthermore, the presence of at least two puller or pusher propellers enables forward speeds to be achieved that are faster than the forward speeds of a helicopter. Thus, at high speed, the fixed wings serve to provide the aircraft with lift, the aircraft then operating as an airplane and no longer as a helicopter.

Furthermore, it is easy to arrange tanks in the fixed wings.

Consequently, the aircraft may have a long range without the carrying capacity in the fuselage being reduced.

It should be observed that arranging tanks in the fixed wings provides greater safety in the event of a crash. Furthermore, this arrangement releases locations in the fuselage that can be used to provide buoyancy volumes.

It can also be understood that the antitorque function for opposing the torque exerted on the fuselage by the rotary wing can be performed by differential thrust from the propellers on the first front half-wing and the propellers on the second front half-wing. For example, the propeller(s) on the first front half-wing exert first forward thrust that is greater than second forward thrust exerted by the propeller(s) of the second front half-wing.

Furthermore, the synergy of the characteristics of the invention, and not a mere juxtaposition of means, enables all of the required safety conditions to be satisfied.

For example, by installing the propellers on the high front wing, it is guaranteed they will not strike the ground regardless of any nose-down angle of the aircraft. Similarly, if the aircraft is running along a runway covered in debris, the propellers are not a priori in any risk of being struck by debris that might be projected by the landing gear, for example.

The propellers can clearly be seen by the crew, thereby limiting risks of accident while taxiing.

Furthermore, arranging the two wings at opposite ends of the fuselage, makes it possible to provide lateral access to the fuselage between the two wings. A passenger boarding the aircraft must not run the risk of being struck by a propeller. This risk is excluded when using a puller propeller projecting from the leading edge of the front wing.

Access via a longitudinally rear door is also possible without risk. In addition, the longitudinally rear door is useful for loading bulky cargo, and also for dropping a load in flight.

Finally, since the rotary wing is arranged in the central portion, interactions between the rotary wing and the fixed wings are minimized or even eliminated.

Thus, the fixed wings degrade auto-rotation flying conditions little or not at all.

The invention thus provides an aircraft having fixed wings and a rotary wing, each type of wing being optimized for a specific range of speeds, while enabling safety targets to be satisfied. More precisely, the rotary wing is optimized for the aircraft moving at a low forward speed, less than 200 km/h, for example, whereas the fixed wings are optimized for the aircraft moving at a high forward speed, e.g. greater than 400 km/h.

Furthermore, the invention may have one or more of the following characteristics presenting synergy with the above-specified characteristics to procure additional effects.

Thus, the rear wing has a first rear half-wing extending transversely from the fuselage in a first rear transverse direction and a second rear half-wing extending transversely from the fuselage in a second rear transverse direction, the aircraft including landing gear provided with a first wheel set fastened to the front portion of the fuselage, a second wheel set fastened to the first rear half-wing, and a third wheel set fastened to the second rear half-wing.

Like the front wing, the rear wing may be continuous or discontinuous. Such landing gear is advantageous insofar as it presents a wide track, with the distance between the second and third wheel sets being greater than 4 meters (m) for example, unlike a helicopter.

Under such circumstances, even if the propeller blades become jammed at a large pitch generating a fast forward speed, the wide-track landing gear enables the aircraft to land at high speed.

It should be observed that the landing gear may be retractable, the first wheel set being retracted into a bay in the front portion of the fuselage while the second and third wheel sets are retracted into the insides of the rear half-wings.

Advantageously, the rear wing is located in the low portion of the rear portion of said fuselage. This characteristic is particularly advantageous when the wheel sets are fastened to the rear wing. The leg connecting the tires of a wheel set to the rear wing then presents optimized dimensions.

Furthermore, the low position of the rear wing is also advantageous in the event of ditching at sea. In addition to providing extra buoyancy, the rear wing has a stabilizing effect and tends to prevent capsizing.

Furthermore, each propeller forms part of a propulsion engine unit provided with a streamlined nacelle fairing an engine of the power plant, the nacelle being mounted on the top suction of a front half-wing.

Because of their high positions, the propellers direct incident air towards the rotary wing, thereby optimizing the efficiency of the rotary wing. By placing the nacelle of a propulsion engine unit on the top of the half-wing, this effect is enhanced, while also increasing ground clearance.

Under such circumstances, the power plant has a plurality of propulsion engine units and the aircraft may include a mechanical interconnection system between said propulsion engine units and said rotary wing.

There is then no need to install one or more engines for driving the rotary wing in rotation.

In a variant of the invention, the rotary wing is continuously driven in rotation by the power plant.

Conversely, in another variant, the aircraft includes declutching means for declutching the rotary wing so that the power plant no longer drives the rotary wing in rotation during certain stages of flight.

Thus, the clutch means declutch the rotary wing as from some given speed. Preferably, the pitch of the blades of the rotary wing is then adjusted to minimize the lift or the drag generated by said rotary wing.

Furthermore, the front wing area of the front wing is optionally substantially equal or exactly equal to the rear wing area of the rear wing. The wing area of a wing is the area of a projection of the wing onto a horizontal plane, including the area within the fuselage.

For example, the front and rear wings may optionally be identical, and may possess a span equal to the diameter of a rotor of the rotary wing. This minimizes the overall size of the aircraft.

Optionally, the fixed wings present a total wing area equal to the sum of a front wing area of the front wing and a rear wing area of the rear wing, the aircraft being suitable for flying at a speed going from zero speed to a maximum speed and passing via a mean speed equal to half the maximum speed, the total wing area generating lift equal to the weight of the aircraft:
- under a load factor equal to the acceleration due to gravity, and at a forward speed equal to the mean speed; and
- under a load factor equal to four times the acceleration due to gravity, and at a forward speed equal to the maximum speed.

Similarly, the aircraft may have stabilization and control surfaces, namely:
- first flaps for controlling pitching and roll arranged at the trailing edge of each wing of the fixed wings; and
- a fin provided with at least one second flap for yaw control; the fin optionally being arranged in the antero-posterior plane of symmetry of the aircraft.

Furthermore, the rotary wing is provided with a rotor having a plurality of blades rotating about an axis of rotation, and the center of gravity of the aircraft moves within a centering range as a function of the loading of the aircraft (passengers, cargo, fuel), a mean center of gravity being placed at the center of the centering range, and the axis of rotation being located in a transverse plane of the aircraft containing the mean center of gravity of the aircraft in order to balance the aircraft.

Thus, the rotor mast is subjected to moments that are minimized. It should be observed that this characteristic is particularly useful in hovering flight insofar as in forward flight the half-wings provide additional lift enabling the center of thrust of the rotor to be aligned with the center of gravity of the aircraft in the flying configuration.

Finally, a first aspect ratio of the front wing may be greater than a second aspect ratio of the rear wing.

It is recalled that the aspect ratio of a wing is equal to the quotient of the square of the wing span divided by the wing area of the wing.

Finally, in an embodiment, the long-range aircraft with high forward speed comprises:
- an airframe having a fuselage extending in a longitudinal direction from a front portion to a rear portion via a central portion, and in a vertical direction from a low portion to a high portion;
- fixed wings comprising solely a front wing and a rear wing as described above and secured to the fuselage;
- a rotary wing provided with a single rotor above said fuselage;
- two propellers for enhancing advance of said aircraft, namely a first propeller mounted on a first front half-wing of the front wing and a second propeller mounted on a second front half-wing of the front wing; and
- a power plant suitable for driving the rotary wing and the propellers in rotation.

BRIEF DESCRIPTION OF THE DRAWINGS

The invention and its advantages appear in greater detail from the following description of an embodiment given by way of illustration with reference to the accompanying figures, in which:

FIG. 1 is a plan view of an aircraft of the invention;
FIG. 2 is a side view of an aircraft of the invention; and
FIG. 3 is a front view of an aircraft of the invention.

Elements present in more than one of the figures are given the same references in each of them.

Three mutually orthogonal directions X, Y, and Z are marked in the figures.

The direction X is said to be longitudinal insofar as the aircraft described extends in this direction. The term "length" applies to the dimensions of the elements described along this longitudinal direction X.

Another direction Y is said to be transverse, and a third direction Z is said to be in elevation and corresponds to the height dimensions of the described structures. The term "thickness" relates to the dimensions of the elements described in this vertical direction Z.

The plane XZ corresponds to the antero-posterior plane of symmetry of the aircraft.

FIGS. 1 and 2 are a plan view and a side view of a high-speed aircraft 1 of the invention.

The aircraft 1 comprises an airframe 2 having a fuselage 10 extending in the longitudinal direction X from a front end towards a rear end. It should be observed that the term "front" and "rear" are commonly used by the person skilled in the art. To define them, it is possible to refer to the forwards direction of the aircraft, with the aircraft moving in forward flight along a first vector going from its rear end towards its front end. In contrast, if the aircraft is reversing, then it moves along a second vector going from its front end towards its rear end.

Along this longitudinal direction X, the fuselage 10 may be subdivided into three portions that are distinct, and possibly of equal length. Consequently, starting from the front end and going towards the rear end, the fuselage 10 comprises a front portion 11, a central portion 12, and a rear portion 13.

Similarly, along the vertical direction Z and starting from the ground, the fuselage may be subdivided into two portions, e.g. of equal thickness, namely a low portion 14 and then a high portion 15, as can be seen in FIG. 2.

With reference to FIG. 1, the aircraft is fitted with fixed wings given overall reference 20 to provide the aircraft with lift at high speed, and with a rotary wing 30 to provide the aircraft with lift at low speed.

The fixed wings 20 comprise a front wing 21 arranged in the high portion 15 of the front portion 14 of the fuselage, and a rear wing 22 that is arranged, on the contrary, in the low portion 14 of the rear portion 13 of the fuselage 10.

The front wing 21 extends transversely, and indeed symmetrically on either side of the fuselage 10.

Under such circumstances, the front wing 21 possesses a first front half-wing 21' extending from the fuselage 10 in a first front transverse direction Y1, i.e. to the left for a passenger facing towards the front of the aircraft 1, and thus downwards on the sheet containing FIG. 1. Similarly, the front wing 21 possesses a second front half-wing 21" extending from the fuselage 10 in a second front transverse direction Y2 opposite to the first front transverse direction Y1, i.e. to the right for a passenger facing toward the front of the aircraft 1 and thus upwards on the sheet containing FIG. 1.

In the embodiment shown, the front wing is a continuous wing and thus the first and second front half-wings 21' and 21" are secured to each other and fastened together to the fuselage by conventional means.

Nevertheless, in a variant, the front wing could be a discontinuous wing with the first and second front half-wings 21' and 21" then being fastened to the fuselage by conventional means independently of each other.

Like any wing, the front wing presents by definition a wing area referred to for convenience as the front wing area S1, and an aspect ratio referred to for convenience as the first aspect ratio $\lambda 1$.

The rear wing 22 extends transversely, in particular symmetrically on either side of the fuselage 10.

Furthermore, the rear wing 22 comprises a first rear half-wing 22' extending from the fuselage 10 in a first rear transverse direction Y3, i.e. to the left for a passenger facing towards the front of the aircraft 1 and thus downwards on the sheet containing FIG. 1. Similarly, the rear wing 22 possesses a second rear half-wing 22" extending from the fuselage 10 in a second rear transverse direction Y4 opposite to the first rear transverse direction Y3, i.e. towards the right for a passenger facing towards the front of the aircraft 1 and thus upwards on the sheet containing FIG. 1.

In the embodiment shown, the rear wing 22 is a continuous wing, but it could be discontinuous wing without going beyond the ambit of the invention.

By definition, the rear wing 22 presents a wing area referred to as the rear wing area S2 for convenience, and an aspect ratio referred, for convenience, to as the second aspect ratio $\lambda 2$.

Advantageously, the front wing area S1 is equal to the rear wing area S2.

The fixed wings thus provide a total wing area equal to the sum of the front wing area plus the rear wing area.

The aircraft is designed to travel at a forward speed extending from a minimum speed equal to zero up to a maximum speed and passing via a mean speed equal to half the maximum speed, and the total wing area may be dimensioned, in terms of "smooth" wing area, i.e. not taking account of the effect of any high-lift devices that might be arranged on the wings, by considering that it generates lift equal to the weight of said aircraft:
- under a load factor equal to the acceleration of gravity g, and at a forward speed equal to the mean speed; and
- under a load factor equal to four times the acceleration of gravity g, and at a forward speed equal to the maximum speed.

The total wing area may then optionally be arranged as front and rear wing areas that are identical.

Furthermore, the front and rear wings 21 and 22 may have spans that are identical or substantially identical, being equal to the maximum diameter D of the disk described by the blades 32 of the rotor 31.

By default, the first aspect ratio $\lambda 1$ of the front wing 21 is possibly greater than the second aspect ratio $\lambda 2$ of the rear wing 22, the span of the front wing then possibly being greater than the span of the rear wing.

In addition, the rotary wing 30 comprises a rotor 31 provided with a plurality of blades 32, the rotor 31 being connected to the fuselage 10 via a transmission gearbox (not shown). The rotor 31 and the gearbox may for example be of the helicopter type and thus comprise all of the component elements of the rotary wing and the gearbox of a helicopter such as swashplates, pitch rods, and servo-controls.

When the rotary wing is driven in rotation by the power plant of the aircraft, the rotor 31 and more particularly the blades 32 of the rotor 31 perform rotary motion about an axis of rotation AX. Since the rotary wing is arranged in the central portion 12 of the fuselage, the axis of rotation AX of the rotor 31 is located between the front and rear wings 21 and 22.

More precisely, the center of gravity of the aircraft is movable over a centering range 200 given as a function of the loading of the aircraft. Since the centering range 200 is centered on the center of gravity referred to, for convenience, as the mean center of gravity "Cgmoy", the axis of rotation AX is advantageously contained in a transverse plane P2, said transverse plane P2 being orthogonal to the antero-posterior plane of symmetry XZ of the aircraft 1 and also containing the mean center of gravity Cgmoy of the aircraft.

In order to propel the aircraft 1, it is possible to tilt the rotor 31 of the rotary wing 30. Nevertheless, in order to reach high speeds, the aircraft 1 includes at least two puller propellers 41, 42 located on the first and second front half-wings 21' and 21".

For example, and with reference to FIG. 1, a first propeller 41 is mounted on the first front half-wing 21' and a second propeller 42 is mounted on the second front half-wing 21". Both of these first and second propellers 41 and 42 are capable of turning in the same direction.

In order to compensate for the first torque exerted by the rotary wing on the fuselage 10 when the rotor 31 is driven in rotation by the power plant, the first and second propellers may exert different thrusts. The resulting differential thrust then generates a second torque on the fuselage to compensate the first torque. Nevertheless, other solutions could be envisaged.

Like the rotary wings 30, the propellers are driven by the power plant of the aircraft 1.

As mentioned above, the synergy that exists between the rotary wing, the front and rear wings, and the propellers offset forward relative to the center of gravity Cg and in a high position in particular so as to blow against the rotor 31, procures numerous advantages making it possible to obtain an aircraft that can land and take off vertically, that has a long range, and that presents greater safety.

Furthermore, the propellers 41 and 42 each form part of a propulsion engine unit 51, 52 having an engine mounted in a nacelle 50. The nacelle of each propulsion engine unit 51, 52 is advantageously streamlined and mounted on the top side 21''' of the corresponding front half-wing 21', 21". The propellers 41 and 42 that are shown diagrammatically are puller propellers, being arranged upstream from the front wing relative to the relative wind, with the slipstream from the propellers on the front wing also generating lift.

It can be understood that the engines of the propeller engine units 51, 52 form part of the power plant of the aircraft.

Preferably, but not exclusively, the power plant does not include any additional engines. Under such circumstances, the aircraft is provided with a mechanical interconnection system 60 connected to the engines of the propulsion engine units 51, 52 and to the rotary wing 30 via the power transmission gearbox driving the rotor 31.

Furthermore, it is possible to provide declutching means 70 for declutching the rotary wing 30, the declutching means being located between the mechanical interconnection system 60 and the power transmission gearbox in order to enable the rotary wing to be disconnected from the engines of the power plant.

In airplane mode, i.e. at a forward speed above a predetermined speed, the rotary wing may optionally no longer be driven, with the aircraft then operating like a compound helicopter. Nevertheless, the autopilot system of the aircraft may act on the swashplates to control the pitch of the blades 32 of the rotor 31 so that the rotary wing generates minimum lift or minimum drag.

Furthermore, it is advantageous for the aircraft to be provided with a stabilization and control surfaces such as, for example:
- first flaps 80, in particular for providing control in pitching and in roll, and arranged on the trailing edges 25, 27 of each of the wings 21 and 22; and
- a vertical tail fin 90 provided with a second flap for yaw control and suitable for pivoting about a vertical axis AX' substantially parallel to the axis of rotation AX of the rotor 31.

The fin 90 is arranged in the antero-posterior plane XZ and may include a horizontal stabilizer substantially perpendicular to the antero-posterior plane XZ, said horizontal stabilizer optionally including at least one third flap for providing control in pitching and in roll.

It should be observed that in order to control the aircraft, the pilot may have the following controls available in particular:
- a thrust control lever TCL suitable for acting collectively on the pitch of the blades of the set of propellers, the pitch of the blades of all of the propellers varying by the same amount;
- a collective pitch lever suitable for acting collectively on the pitch of the blades of the rotor 31, with the pitch of all of the blades of the rotary wing varying by the same amount;
- a cyclic stick for causing the pitch of the blades of the rotor 31 to vary cyclically and for acting on the first and third flaps; and
- rudder pedals suitable for acting differentially on the pitches of the propeller blades, the pitch of the blades of the propellers on one half-wing increasing by a certain amount and the pitch of the blades of the propellers on the other half-wing decreasing by the same amount.

The orders given by a control may be modulated by some given variable, e.g. the position of the thrust control lever, with the order given by one control possibly influencing another control by a coupling effect, where appropriate.

FIG. 2 is a side view of the aircraft 1 showing in particular that it is possible to arrange a side access door 100 on the fuselage 10 between the front and rear wings 21 and 22, and a longitudinally rear door 101 in the rear portion 13 of the fuselage 10.

Furthermore, FIG. 2 shows the landing gear 120 of the aircraft, the landing gear comprising a first wheel set 121 located in the front portion 11 of the fuselage and second and third wheel sets fastened under the rear wing 22.

FIG. 3 shows the wheel sets of the landing gear 120 more clearly.

Consequently, the first wheel set 121 is provided with two wheels fastened to a leg that is retractable by pivoting from the rear towards the front of the aircraft 1.

In contrast, the second wheel set 122 is provided with a wheel that is fastened to a leg that is attached to the first rear half-wing 22'. Similarly, the third wheel set 123 is provided with a wheel fastened to a leg that is attached to the second rear half-wing 22". The second and third wheel sets 122 and 123 are retractable respectively into the first and second rear half-wings 22' and 22".

It should be observed that the distance D1 between the second and third wheel sets 122 and 123, and in particular between their wheels, is large, thereby enabling the aircraft to land at high speed.

Furthermore, since the rear wing 22 is in the low position, unlike the front wing 21, the length of the legs of the second and third wheel sets 122 and 123 is minimized.

It should be observed that it is possible to use different numbers of wheels for each of the wheel sets.

Naturally, the present invention may be subjected to numerous variations as to its implementation. Although an embodiment is described above, it will readily be understood that it is not conceivable to identify exhaustively all possible embodiments. It is naturally possible to envisage replacing any of the means described by equivalent means without going beyond the ambit of the present invention.

What is claimed is:

1. An aircraft with a long-range and with high forward speed, the aircraft comprising:
   an airframe provided with a fuselage extending along a longitudinal direction (X) from a front portion towards a rear portion and passing via a central portion, and in a vertical direction (Z) from a low portion to a high portion;
   fixed wings secured to the fuselage;
   a rotary wing above the the fuselage;
   at least two propellers for enhancing advance of the aircraft; and
   a power plant suitable for driving the rotary wing and the propellers into rotation;
   wherein the fixed wings comprise a front wing arranged in the high portion of the front portion of the fuselage and a rear wing arranged in the rear portion of the fuselage, the front and rear wings each extending transversely on either side of the fuselage, the front wing having a first front half-wing extending transversely from the fuselage in a first front traverse direction (Y1) and a second front half-wing extending transversely from the fuselage in a second front transverse direction (Y2), at least one of the propellers being mounted on the first front half-wing and at least one of the propellers being mounted on the second front half-wing, the rotary wing being arranged in the central portion so that the axis of rotation (AX) of a rotor of the rotary wing lies between the front and rear wings, wherein the rear wing is located in the low portion of the rear portion of the fuselage.

2. An aircraft according to claim 1, wherein the rear wing has a first rear half-wing extending transversely from the fuselage in a first rear transverse direction (Y3) and a second rear half-wing extending transversely from the fuselage in a second rear transverse direction (Y4), the aircraft including landing gear provided with a first wheel set fastened to the front portion of the fuselage, a second wheel set fastened to the first rear half-wing, and a third wheel set fastened to the second rear half-wing.

3. An aircraft according to claim 1, wherein each propeller forms part of a propulsion engine unit provided with a streamlined nacelle fairing an engine of the power plant, the nacelle being mounted on the top of a front half-wing.

4. An aircraft according to claim 1, wherein the power plant has a plurality of propulsion engine units, the aircraft including a mechanical interconnection system between the propulsion engine units and the rotary wing.

5. An aircraft according to claim 1, including declutching means for declutching the rotary wing so that the power plant no longer drives the rotary wing in rotation during certain stages of flight.

6. An aircraft according to claim 1, wherein a front wing area of the front wing is equal to a rear wing area of the rear wing.

7. An aircraft according to claim 1, wherein the fixed wings present a total wing area equal to the sum of a front wing area of the front wing and a rear wing area of the rear wing, the aircraft being suitable for flying at a speed going from zero speed to a maximum speed and passing via a mean speed equal to half the maximum speed, the total wing area generating lift equal to the weight of the aircraft:
  under a load factor equal to the acceleration due to gravity, and at a forward speed equal to the mean speed; and
  under a load factor equal to four times the acceleration due to gravity, and at a forward speed equal to the maximum speed.

8. An aircraft according to claim 1, including stabilization and control surfaces, namely:
  first flaps for controlling pitching and roll arranged at the trailing edge of each wing of the fixed wings; and
  a fin provided with at least one second flap for yaw control.

9. An aircraft according to claim 1, wherein the rotary wing is provided with a rotor having a plurality of blades rotating about an axis of rotation (AX), and the center of gravity of the aircraft moves within a centering range as a function of the loading of the aircraft, a mean center of gravity (Cgmoy) being placed at the center of the centering range, and the axis of rotation (AX) being located in a transverse plane (P2) of the aircraft containing the center of gravity of the aircraft.

10. An aircraft according to claim 1, wherein a first aspect ratio ($\lambda 1$) of the front wing is greater than a second aspect ratio ($\lambda 2$) of the rear wing.

11. An aircraft with a long-range and with high forward speed, the aircraft comprising:
  an airframe provided with a fuselage extending along a longitudinal direction (X) from a front portion towards a rear portion, and in a vertical direction (Z) from a low portion to a high portion, the high portion being disposed above the low portion;
  fixed wings secured to the fuselage;
  a rotary wing above the fuselage;
  at least two propellers for enhancing advance of the aircraft; and
  a power plant suitable for driving the rotary wing and the propellers into rotation;
  wherein the fixed wings comprise a front wing extending transversely from the high portion of the front portion of the fuselage and a rear wing extending transversely from the low portion of the rear portion of the fuselage, the front wing having a first front half-wing extending transversely from the fuselage in a first front traverse direction (Y1) and a second front half-wing extending transversely from the fuselage in a second front transverse direction (Y2) opposite the first front transverse direction, at least one of the propellers being mounted on the first front half-wing and at least one of the propellers being mounted on the second front half-wing, the rotary wing being arranged above a central portion of the fuselage so that the axis of rotation (AX) of a rotor of the rotary wing lies between the front and rear wings.

12. An aircraft according to claim 11, wherein the rear wing has a first rear half-wing extending transversely from the fuselage in a first rear transverse direction (Y3) and a second rear half-wing extending transversely from the fuselage in a second rear transverse direction (Y4) opposite the first rear transverse direction, the aircraft including landing gear provided with a first wheel set fastened to the front portion of the fuselage, a second wheel set fastened to the first rear half-wing, and a third wheel set fastened to the second rear half-wing.

13. An aircraft according to claim 11, wherein the rear wing is disposed entirely behind the front wing.

14. An aircraft according to claim 11, wherein the power plant has a plurality of propulsion engine units, the aircraft including a mechanical interconnection system between the propulsion engine units and the rotary wing.

15. The aircraft of claim 14, wherein the rear wing has a first rear half-wing extending transversely from the fuselage in a first rear transverse direction (Y3) and a second rear half-wing extending transversely from the fuselage in a second rear transverse direction (Y4).

16. An aircraft according to claim 11, wherein the rotary wing is provided with a rotor having a plurality of blades rotating about an axis of rotation (AX), and the center of gravity of the aircraft moves within a centering range as a function of the loading of the aircraft, a mean center of gravity (Cgmoy) being placed at the center of the centering range, and the axis of rotation (AX) being located in a transverse plane (P2) of the aircraft containing the center of gravity of the aircraft.

17. An aircraft with a long-range and with high forward speed, the aircraft comprising:
  an airframe provided with a fuselage extending along a longitudinal direction (X) from a front portion towards a rear portion, and in a vertical direction (Z) from a low portion to a high portion, the front portion being disposed in front of the rear portion and the high portion being disposed above the low portion;
  a front wing secured to the front portion and the high portion of the fuselage;
  a rear wing secured to the rear portion and the low portion of the fuselage;
  a rotary wing supported above the fuselage;
  at least two propellers for enhancing advance of the aircraft; and
  a power plant suitable for driving the rotary wing and the propellers into rotation;
  the front wing extending transversely from the high and front portions of the fuselage and the rear wing extending transversely from the low and rear portions of the fuselage,
  the at least two propellers being mounted on the front wing, and
  the rotary wing being arranged above a central portion of the fuselage so that the axis of rotation (AX) of a rotor of the rotary wing lies between the front and rear wings.

18. The aircraft of claim 17, wherein the front wing has a first front half-wing extending transversely from the fuselage in a first front traverse direction (Y1) and a second front half-wing extending transversely from the fuselage in a second front transverse direction (Y2), at least one of the propellers being mounted on the first front half-wing and at least one of the propellers being mounted on the second front half-wing.

19. The aircraft of claim 17, wherein the wings present a total wing area equal to the sum of a front wing area of the front wing and a rear wing area of the rear wing, the aircraft being suitable for flying at a speed going from zero speed to a maximum speed and passing via a mean speed equal to half the maximum speed, the total wing area generating lift equal to the weight of the aircraft:
  under a load factor equal to the acceleration due to gravity, and at a forward speed equal to the mean speed; and under a load factor equal to four times the acceleration due to gravity, and at a forward speed equal to the maximum speed.

20. The aircraft of claim 17, wherein the rotary wing is provided with a rotor having a plurality of blades rotating about an axis of rotation (AX), and the center of gravity of the aircraft moves within a centering range as a function of the loading of the aircraft, a mean center of gravity (Cgmoy) being placed at the center of the centering range, and the axis of rotation (AX) being located in a transverse plane (P2) of the aircraft containing the center of gravity of the aircraft.

* * * * *